March 9, 1965       C. O. JONKERS ETAL       3,172,262
CONTROL MECHANISMS FOR HYDRAULICALLY OPERATED VARIABLE
RATIO POWER TRANSMISSION SYSTEMS
Filed July 13, 1962                     5 Sheets-Sheet 1
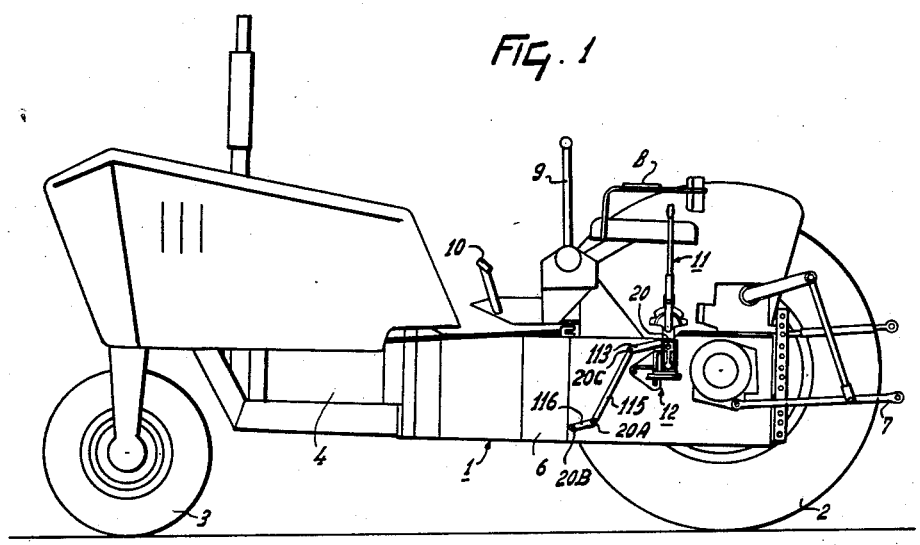
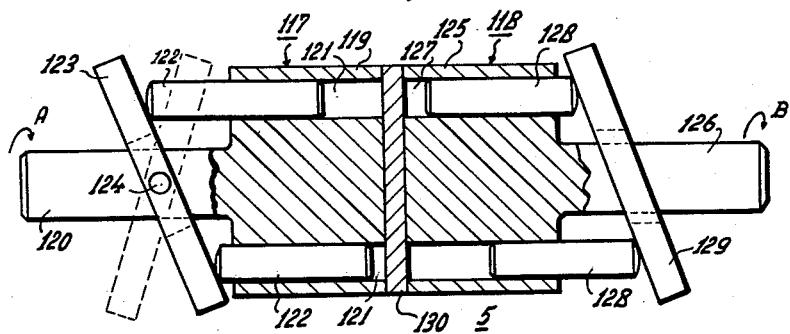
INVENTORS
CORNELIUS OTTO JONKERS
FOPPE HILBERTUS FOCKENS
BY
Mason, Mason & Albright
Attorneys

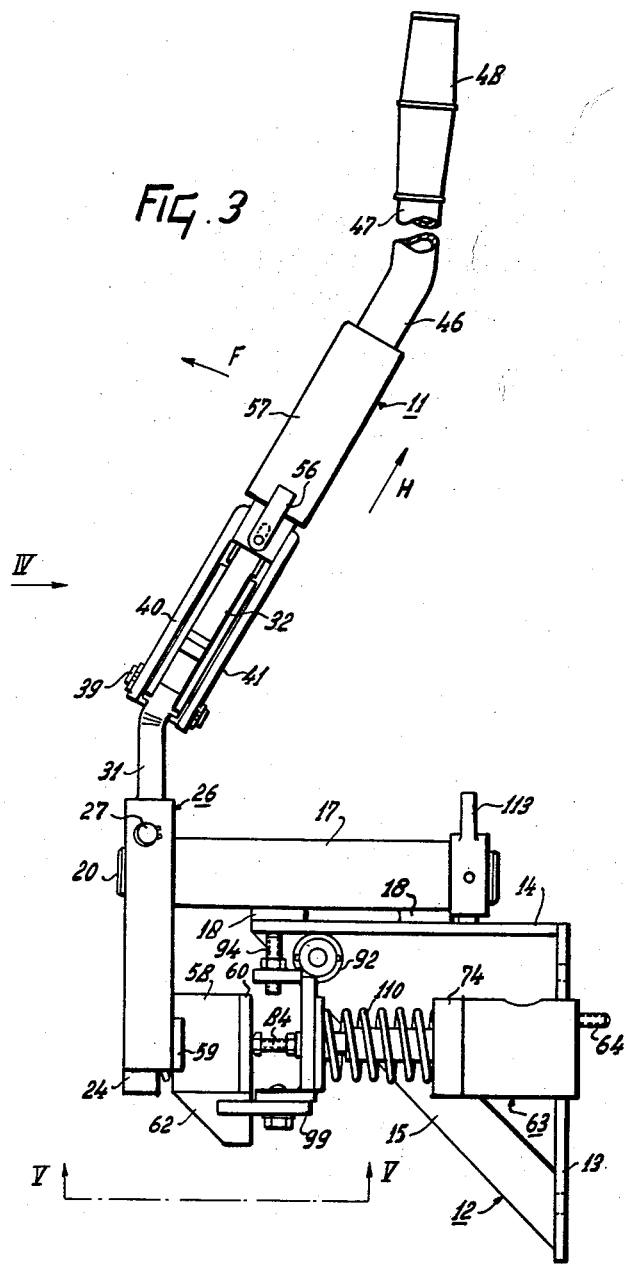

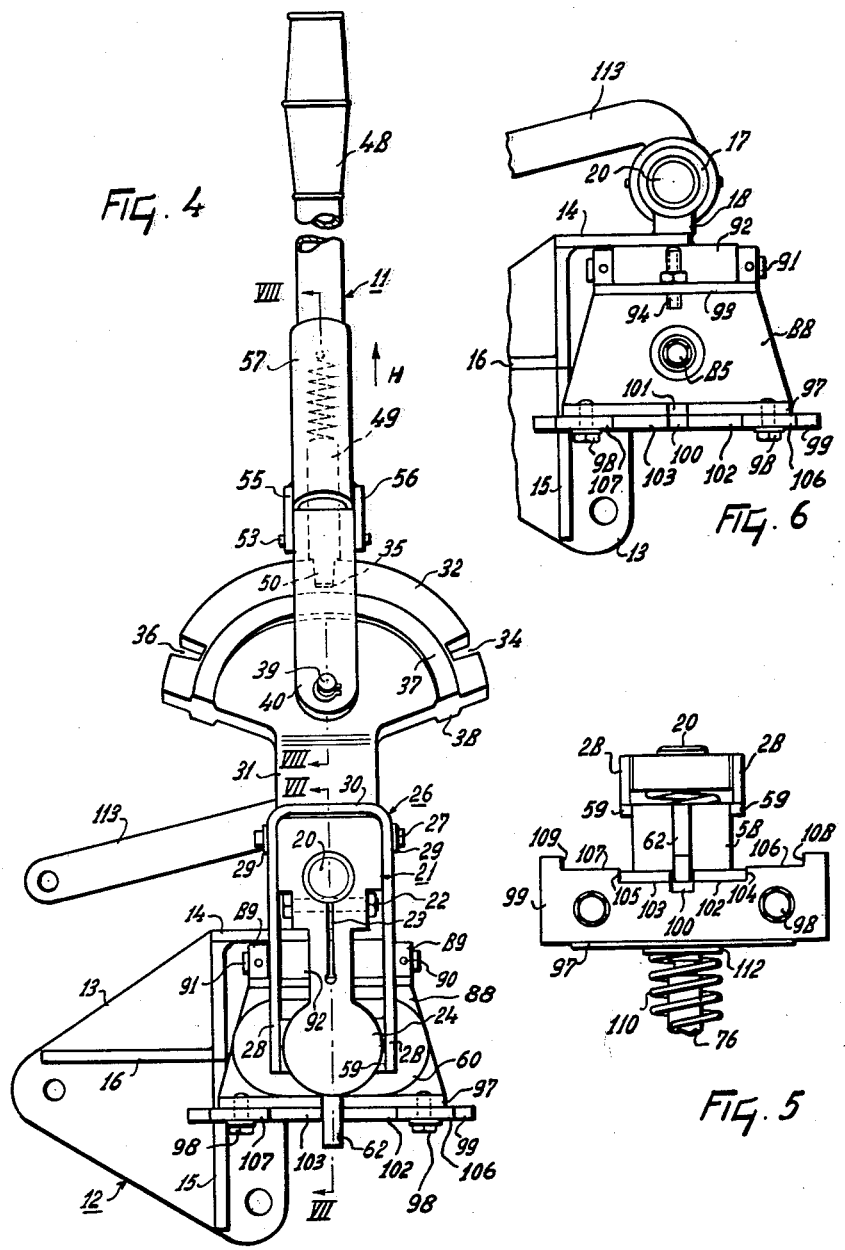

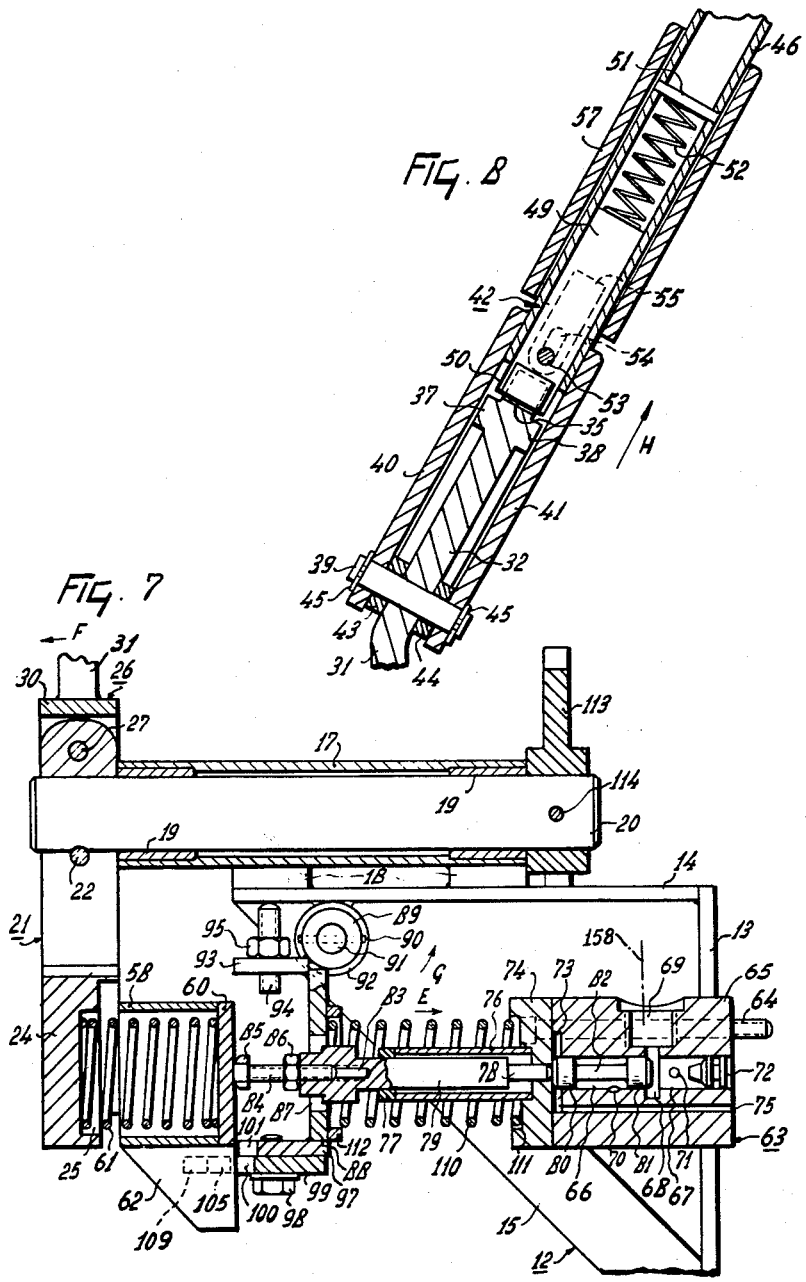

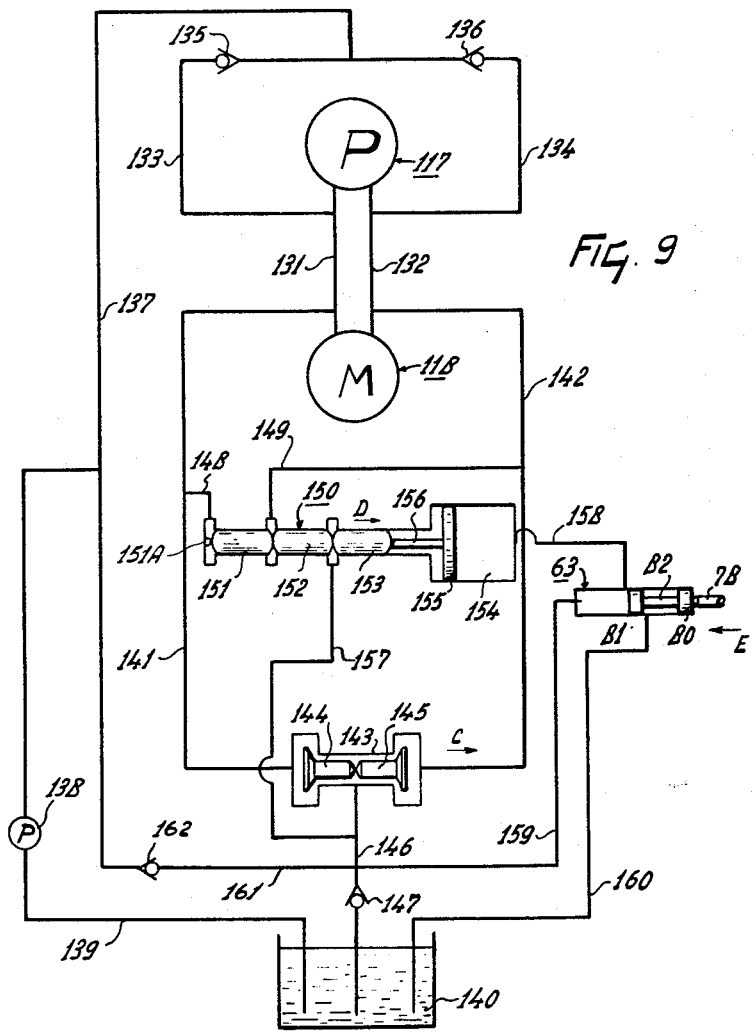

ical tractor which is illustrated has a frame 1 which is
United States Patent Office 3,172,262
Patented Mar. 9, 1965

3,172,262
CONTROL MECHANISMS FOR HYDRAULICALLY OPERATED VARIABLE RATIO POWER TRANSMISSION SYSTEMS
Cornelius Otto Jonkers, Delft, and Foppe Hilbertus Fockens, Maasland, Netherlands, assignors to C. Van der Lely N.V., Maasland, Netherlands, a Dutch limited-liability company
Filed July 13, 1962, Ser. No. 209,638
Claims priority, application Netherlands, Aug. 17, 1961, 268,356
12 Claims. (Cl. 60—53)

This invention relates to control mechanisms for hydraulically operated variable ratio power transmission systems, such systems being of the kind comprising a pump and a motor interconnected in such a way that, during operation, liquid under pressure flows from the pump to the motor, there being a control member which is arranged so as to be movable to vary the transmission ratio of the system.

It is an object of the invention to provide control mechanism by which the transmission of power to the motor of such a system can rapidly be discontinued in a simple and foolproof manner in any transmission ratio control setting of said mechanism.

According to the invention, there is provided a control mechanism for a system of the kind set forth wherein at least a part of the control member is arranged so as to be movable in any control setting thereof in a direction which is inclined to the direction in which the control member is movable to vary the transmission ratio, the arrangement being such that, upon moving the part in said inclined direction, a valve is operated to place relatively high and low pressure regions of the system in open communication whereby the pump is prevented from driving the motor.

For a better understanding of the invention, and to show how the same may be carried into effect, reference will now be made, by way of example, to the accompanying drawings, in which:

FIGURE 1 is a side elevation of a tractor having a control mechanism in accordance with the invention, one driven ground wheel of the tractor being omitted for the sake of clarity, FIGURE 2 is a diagrammatic sectional representation of the hydraulically operated variable ratio power transmission system of the tractor of FIGURE 1, FIGURE 3 is a view, to an enlarged scale, showing part of the control mechanism in greater detail, and also showing its attachment to the frame of the tractor, FIGURE 4 is a view as seen in the direction indicated by the arrow IV of FIGURE 3, FIGURE 5 is a view as seen in the direction indicated by the arrows V—V of FIGURE 3, FIGURE 6 corresponds to FIGURE 4 but shows the control mechanism with a control lever thereof and other associated parts omitted, FIGURE 7 is a section, to an enlarged scale, taken on the line VII—VII of FIGURE 4, FIGURE 8 is a section, to an enlarged scale, taken on the line VIII—VIII of FIGURE 4, and FIGURE 9 is a schematic representation of the power transmission system of the tractor of FIGURE 1 illustrating the mode of use of the control mechanism.

Referring to FIGURE 1 of the drawings, the agricultural tractor which is illustrated has a frame 1 which is supported by two driven ground wheels 2 arranged at opposite ends of an axle and by a steerable ground wheel 3 which is located mid-way between the two ground wheels 2 considered in the intended direction of travel of the tractor. An internal combustion engine 4 is arranged in the frame 1 and is connected to the driven ground wheels 2 by way of a hydraulically operated variable ratio power transmission system 5 (FIGURE 2) which is accommodated within a housing 6 forming part of the frame 1.

The tractor also includes a hydraulically operated three-point lifting device 7 and a driving seat 8 which latter, together with control levers 9 and control pedals 10, is angularly adjustable about a substantially vertical axis. Means is provided to retain the seat 8 in any one of a number of different angular settings about said axis.

A control mechanism is provided for the system 5, the said mechanism having a control lever 11 which is connected to the frame 1 with the aid of a support 12. The support 12 includes a vertical plate 13 (FIGURES 3 and 4) which is secured to the frame 1 with the aid of bolts. A beam 14 of L-shaped cross-section is fastened to the plate 13 so as to extend perpendicular thereto, the connection between the plate 13 and the beam 14 being reinforced by struts 15 and 16. The upper horizontal limb of the beam 14 carries supports 18 to which a sleeve 17 is secured in such a way that its longitudinal axis extends substantially perpendicular to the intended direction of travel of the tractor. Two bearings 19 (FIGURE 7) are arranged within the opposite ends of the sleeve 17 and a shaft 20 is rotatably journalled in these bearings.

The end of the shaft 20 remote from the frame 1 of the tractor is entered in a hole in a coupling member which is generally indicated by the reference numeral 21. The coupling member 21 is clamped to the end of the shaft 20 with the aid of a bolt 22 (FIGURES 4 and 7), the said hole in the coupling member 21 communicating with an elongated slot 23 which is provided to enable the walls of the hole which receives the shaft 20 to be resiliently deformed to a very slight extent to grip that shaft upon tightening the bolt 22. The bore which receives the bolt 22 opens laterally into the hole for the shaft 20 which shaft is formed with a matching groove so that, upon bringing the said groove into register with the bolt bore, and entering the bolt 22 through its bore, the coupling member 21 is retained against axial displacement and rotational displacement relative to the shaft 20.

A portion 24 of the coupling member 21 which is disposed below the shaft 20 has a thickness which, considered in a direction parallel to the longitudinal axis of the shaft 20, is less than that of the remainder of the coupling member (see FIGURE 7). A cylindrical recess 25 is formed in that side of the portion 24 which faces the frame 1 of the tractor.

An inverted U-shaped bracket 26 is provided at the lower end of the control lever 11 and is pivotally connected to the shaft 20 by a pin 27 which is entered through two holes in the limbs 28 of the bracket 26 and through a registering hole in the coupling member 21 which hole extends immediately above, and perpendicular to, the shaft 20. The pin 27 is retained against axial displacement by means of two resilient rings, circlips or the like 29 which are received in grooves formed adjacent the opposite ends of the pin 27.

A vertical plate 31 is rigidly secured to the base 30 of the inverted U-shaped bracket 26, the said plate 31 being integral with a sector plate 32 which is bent over towards the frame 1 of the tractor in such away that it is contained in a plane which is inclined to the vertical at an angle of about 30°. The uppermost curved edge of the plate 32 is provided with three notches 34, 35 and 36, the notches 34 and 36 being equally spaced on opposite sides of the notch 35 by arcs which subtend angles of approximately 68° at a shaft 39 which is disposed approximately centrally of the sector plate 32. The sector plate 32 is formed with two integral arcuate flanges 37 and 38 on its opposite sides, these flanges being disposed immediately radially inwardly of the notches 34, 35 and 36 and having their centers of curvature coincident with the shaft 39.

The shaft 39 is entered in a hole in the sector plate 32 and its longitudinal axis extends perpendicular to the plane of the said plate. The shaft 39 is also entered through holes formed at the lowermost ends of two arms 40 and 41 (FIGURE 8) which are disposed on relatively opposite sides of the sector plate 32. The opposite ends of these arms are secured to a tube 42. It will be noted from FIGURE 8 that the arms 40 and 41 are spaced from the opposite sides of the sector plate 32 in the region of the shaft 39 by two spacing rings 43 and 44 respectively which are disposed around the shaft 39 between the sector plate 32 and the two arms 40 and 41. The shaft 39 is retained against axial displacement by two resilient washers, circlips or the like 45 which are entered in grooves formed in the shaft 39 adjacent its opposite ends. The tube 42 includes two portions 46 and 47 (FIGURE 3) which are inclined to one another at an angle of approximately 25°, the uppermost free end of the portion 47 being provided with a handle 48. The control lever 11 which is formed principally by the tube 42 and the handle 48 is pivotally connected to the sector plate 32 by the shaft 39 and the sector plate 32 is itself pivotally connected to the bracket 26 by the pin 27.

The portion 46 of the tube 42 contains a locking pin 49 the lowermost end 50 of which has a shape such that it will fit in any one of the three notches 34 to 36. The portion 46 also contains a transverse pin 51 against which one end of a helical compression spring 52 bears. The opposite end of the spring 52 bears against the uppermost end of the locking pin 49 and urges the latter downwardly towards the notched edge of the sector plate 32. A transverse hole is formed through the locking pin 49 adjacent its lowermost end 50 and a pin 53 is entered through this hole so as to extend perpendicular to the longitudinal axis of the locking pin 49. The opposite ends of the pin 53 are disposed in elongated slots 54 formed in two lugs 55 and 56 which are rigidly secured to the lowermost end of a sleeve 57 which surrounds, and is axially slidable relative to, the portion 46 of the tube 42. As can be seen in FIGURE 4, the sleeve 57 can be slid relative to the portion 46 in the direction indicated by the arrow H to withdraw the end 50 of the locking pin 49 from engagement with one of the notches 34 to 36.

A cylindrical sleeve 58 is secured to the lowermost ends of the limbs 28 of the bracket 26 by supports 59, the sleeve 58 being located on that side of the coupling member 21 which is closest to the frame 1 of the tractor. The longitudinal axis of the sleeve 58 extends substantially perpendicular to the intended direction of travel of the tractor and the end of the sleeve which is closest to the frame 1 is closed by an oval plate 60 which extends perpendicular to the longitudinal axes of the sleeve 58 and the shaft 20. A helical compression spring 61 is housed within the sleeve 58 and bears between the innermost end of the recess 25 of the portion 24 of the coupling member 21 and the plate 60. A plate 62 is secured to the sleeve 58 and projects radially downwardly relative to the said sleeve.

A valve housing 63 (FIGURE 7) is secured to the frame 1 of the tractor adjacent the support 12 by bolts 64. The valve housing comprises a block 65 in which two aligned cylindrical chambers 66 and 67 are formed, the said chambers being interconnected by a further chamber 68 of greater diameter. The further chamber 68 which is located between the chambers 66 and 67 is connected with a screw-threaded hole 69 which opens through a wall of the block 65 and to which a duct can be connected. A duct 70 opens into the chamber 66 and, similarly, a duct 71 opens into the chamber 67. The end of the chamber 67 remote from the chamber 68 is closed by a plug 72 whereas the end of the chamber 66 remote from the chamber 68 communicates with a recess 73 of larger diameter which is formed in the block 65 and which communicates with the atmosphere by way of a passage 75.

The recess 73 is closed by a cover 74 which is provided with a central bore whose longitudinal axis registers with the longitudinal axes of the chambers 66 and 67. A sleeve 76 is secured to the cover 74 in such a way that its longitudinal axis coincides with the common longitudinal axis just mentioned. The end of the sleeve 76 remote from the cover 74 carries a ring 77 in which a bore is formed whose longitudinal axis also coincides with the axis just mentioned. The bore in the cover 74 receives the reduced diameter tip 78 of a pin 79 which is axially slidable in the bore in the ring 77 and a major portion of which is disposed within the sleeve 76. The tip 78 of the pin 79 bears against a valve member which has two heads 80 and 81 of the same diameter as the chambers 66 and 67 and an interconnecting rod 82 of reduced diameter.

The end of the pin 79 remote from the tip 78 is formed with a screw-threaded bore 83 in which a correspondingly screw-threaded bolt 84 is received. The bolt 84 has a head 85 which bears against the plate 60 and the said bolt can be retained in any desired setting relative to the pin 79 by means of a lock nut 86 which can be tightened against the end of the pin 79. The said end of the pin 79 is entered through a hole 87 formed in a plate 88 which plate carries two cylindrical rings 89 which are secured to the opposite ends of a shaft 91 by means of small transverse pins 90. The shaft 91 is journalled in a bearing 92, disposed between the two cylindrical rings 89, the bearing 92 being rigidly secured to the beam 14 of the support 12.

A plate 93 is secured to the plate 88 and to the cylindrical rings 89 so as to extend perpendicular to the plate 88, the plate 93 being formed with a screw-threaded hole which receives a correspondingly screw-threaded stud 94. The uppermost end of the stud 94 bears against the upper horizontal limb of the beam 14 and the said stud can be retained in any desired position relative to the plate 93 by means of a lock nut 95 which bears against the uppermost surface of the said plate. A plate 97 is secured to the lowermost end of the plate 88 so as to extend parallel to the plate 93 and a further parallel plate 99 is secured to the underside of the plate 97 with the aid of bolts 98 (see FIGURES 5 and 7). The plate 99 affords a stop member and the edge thereof which faces the plate 62, which is indirectly connected with the control lever 11, has a stepped formation. The center of the said edge of the plate 99 is formed with a slot 100 whose width is very slightly in excess of the width of the plate 62 and the superposed plate 97 is formed with a similar registering slot 101. The said edge of the plate 99 is formed with two potrions 102 and 103 on opposite sides of the slot 100, these portions extending perpendicular to the longitudinal axis of the shaft 20. The said portions 102 and 103 terminate in relatively perpendicular steps 104 and 105 from which further edge portions 106 and 107 extend parallel to the portions 102 and 103 to terminate in further relatively perpendicular steps 108 and 109.

A helical compression spring 110 bears between the plate 88 and the cover 74 of the valve housing 63. The spring 110 is substantially concentric with the sleeve 76 and is retained against lateral displacement relative to the cover 74 by having one end entered in a recess 111 formed in the said cover and against lateral displacement relative to the plate 88 by a ring 112 which is secured to that plate so as to surround the end of the spring 110 which bears against the plate 88. The degree of compression of the spring 110 can be adjusted by turning the plate 88 about the longitudinal axis of the shaft 91 and retaining the said plate in its chosen position by varying the extent to which the stud 94 projects from the plate 93.

The end of the shaft 20 remote from the control lever 11 is entered through a hole in one end of an arm 113, a small transverse pin 114 being employed to secure these parts rigidly to one another. The end of the arm 113 remote from the shaft 20 is connected by a pivot pin 20C (FIGURE 1) to the upper end of a link 115 whose lower end is connected by a further pivot pin 20A to the free end of an arm 116 which projects from a shaft 20B which is journalled in the frame 1 so as to extend substantially perpendicular to the intended direction of travel of the tractor. The pivot pins 20C and 20A and also the shaft 20B extend parallel to the shaft 20 and the shaft 20B is connected to the transmisison system 5 which is arranged within the housing 6.

The part of the system 5 which is shown diagrammatically in FIGURE 2 comprises a hydraulic pump 117 and a hydraulic motor 118. The pump 117 has a housing 119 which is rigidly secured to a shaft 120 which is adapted to be driven by the engine 4 of the tractor. The housing 119 is formed with a plurality of chambers 121 which extend parallel to the longitudinal axis of the shaft 120 and each of which contains an axially movable piston or plunger 122. Each piston 122 bears against a swash plate 123 which is turnably mounted on a shaft 124. The motor 118 is formed in a similar manner with a housing 125 secured to an output shaft 126, the housing having a plurality of chambers 127 in each of which a piston or plunger 128 is axially slidable. Each piston or plunger 128 bears against a swash plate 129 whose plane is inclined to the longitudinal axis of the shaft 126 at an angle of substantially less than 90°. The pump housing 119 and the motor housing 125 are separated from one another by a relatively stationary block or plate 130 which is diagrammatically represented in FIGURE 2. This block or plate 130 is formed with slots (not shown) through which hydraulic pressure medium, such as oil, can pass to and fro between the pump 117 and motor 118. As previously mentioned, the shaft 120 is connected to the engine 4 of the tractor whereas the output shaft 126 is drivingly connected to the two ground wheels 2. The shaft 124 upon which the swash plate 123 is turnably mounted is connected with the shaft 20B in such a way that a rotation of that shaft produces an alteration in the angular setting of the swash plate 123.

When the shaft 124 occupies a position such that the plane of the swash plate 123 is disposed perpendicular to the longitudinal axis of the shaft 120, rotation of the shaft 120 and of the housing 119 will not cause any axial displacement of the pistons 122 in the chambers 121. However, when the swash plate 123 is turned into, for example, the position shown in full lines in FIGURE 2, rotation of the shaft 120 will cause the pistons 122 to reciprocate in their respective chambers 121, this reciprocation causing the hydraulic pressure medium to be pumped through the block or plate 130 to the motor 118. The motor pistons 128 will be compelled to move axially in a similar manner to the pump pistons 122 and the position of the swash plate 129 is such that they can only do this when the housing 125 and output shaft 126 are rotating. When the shaft 120 is rotating in the direction indicated by the arrow A and the swash plate 123 occupies the angular position shown in full lines, the output shaft 126 will be rotated in the direction B which is the same as the direction A. A change in the angular setting of the swash plate 123 will cause an increase or decrease in the number of revolutions per unit time of the shaft 126 without any change in the number of revolutions per unit time of the shaft 120. When the swash plate 123 is moved into the angular position shown in broken lines and the shaft 120 is rotated in the direction A, the output shaft 126 will be caused to rotate in a direction opposite to the direction B and it will thus be apparent that the part of the system 5 which is shown in FIGURE 2 is adapted to function as a variable ratio and reversible gear.

FIGURE 9 shows diagrammatically the whole of the hydraulic transmission system of the tractor, those parts which have already been described being denoted by the same reference numerals as have been used in the preceding figures. It can be seen that the pump 117 and motor 118 are interconnected by two ducts 131 and 132 which include the aforementioned slots formed in the block or plate 130. A duct 133 communicates with the duct 131 and includes a one-way valve 135 and, similarly, a duct 134 communicates with the duct 132 and includes a one-way valve 136. The two ducts 133 and 134 are branches of a further single duct 137 which communicates with the delivery side of a supply pump 138 for the hydraulic pressure medium. The inlet side of the pump 138 is in communication with a reservoir 140 by way of a duct 139. The ducts 131 and 132 are also in communication with ducts 141 and 142 respectively, these latter ducts leading to opposite sides of a valve housing 143 which is only diagrammatically illustrated. The valve housing 143 contains two opposed movable valve members 144 and 145 which are in contact with one another. A duct 146 leads from a central region of the valve housing 143 to the reservoir 140 by way of a one-way valve 147.

The ducts 131 and 132 are also in communication with two ducts 148 and 149 respectively by way of the ducts 141 and 142 respectively, the ducts 148 and 149 communicating with chambers of a diagrammatically illustrated valve housing 150. The valve housing 150 has a cylindrical bore in which three separate plungers 151, 152 and 153 are axially slidable. The cylindrical bore of the valve housing 150 communicates with a cylinder 154 of substantially greater diameter in which a piston 155 is axially slidable. The piston 155 carries a piston rod 156 whose free end can enter the cylindrical bore and contact one end of the plunger 153. A chamber of the valve housing 150 communicates by way of a duct 157 with the duct 146 and opens into the latter between the valve housing 143 and the one-way valve 147. In the position of the plungers 151 to 153 which is illustrated in FIGURE 9, the chamber which communicates with the duct 157 is located around the contacting ends of the two plungers 152 and 153. The end of the cylinder 154 remote from the cylindrical bore of the valve housing 150 communicates by way of a duct 158 with the chamber 68 (FIGURE 7) of the valve housing 63, the connection being made by utilising the screw-threaded hole 69. A duct 159 connects the duct 71 (FIGURE 7) with the duct 146 at a point between the valve housing 143 and the one-way valve 147 and a duct 160 connects the duct 70 (FIGURE 7) with the reservoir 140. A further duct 161 opens into the duct 146 between the valve housing 143 and the one-way valve 147 and connects the said duct 146 to the duct 137 by way of a one-way valve 162.

When the engine 4 of the tractor is operating and driving the supply pump 138, hydraulic pressure medium is supplied to the duct 137. In accordance with the angular setting of the swash plate 123, the pump 117 will supply hydraulic pressure medium to the motor 118 through either the duct 131 or the duct 132 and the said fluid pressure medium will be returned to the pump 117 through the other one of the two ducts 131 and 132. In the case in which the duct 131 supplies fluid pressure medium from the pump 117 to the motor 118, the fluid pressure in the duct 131 will be relatively high and that in the duct 132 relatively low. Accordingly, the one-way valve 135 will remain closed and the contacting valve members 144 and 145 will be displaced in the valve housing 143 in the direction indicated by the arrow C. The arrangement of the valve housing 143 is such that, in this case, the duct 132 communicates with the duct 146 by way of the duct 142 and the interior of the said housing 143. The supply pump 138 delivers hydraulic pressure medium to the duct 132 by way of the one-way valve 136 and the duct 134, the pressure in the duct 132 being dependent upon the pressure exerted by the biasing means of the one-way valve 147 which means must, of course, be overcome before liquid can pass through the valve 147.

The cylinder 154 is in communication with the duct 146 by way of the ducts 158 and 159 and the chambers 67 and 68 of the valve housing 63 so that the pressure within the cylinder 154 is also dependent upon the pressure exerted by the biasing means of the one-way valve 147. The relatively high pressure duct 131 is in communication by way of the duct 148 with a chamber of the valve housing 150 in which the free end of the plunger 151 rests against a stop 151A, so that, obviously, the said end is subjected to the pressure prevailing in the duct 131. However, since the area of the piston 155 which is subjected to the pressure prevailing within the cylinder 154 is considerably greater than the area of the aforementioned end of the plunger 151, the piston 155 and the plungers 151 to 153 will maintain the position illustrated in FIGURE 9 during normal operation of the tractor. If, for some reason, the pressure in the duct 131 should rise to too high a value, the force acting on the free end of the plunger 151 will overcome the force acting upon the piston 155 and the three plungers, together with the piston 155, will be moved in the direction indicated by the arrow D in FIGURE 9. This causes the two ducts 148 and 149 to be brought into open communication with one another by way of the left-hand end (in the drawing) of the cylindrical bore of the valve housing 150 so that the pressures in the two ducts 131 and 132 are equalised and the motor 118 is no longer driven by the pump 117.

In the case in which the swash plate 123 occupies an angular setting which is such that the pump 117 supplies hydraulic pressure medium to the motor 118 by way of the duct 132 so that the said duct contains hydraulic pressure medium at relatively high pressure, the one-way valve 135 opens and the one-way valve 136 remains closed while the valve members 144 and 145 are displaced in the valve housing 143 in a direction opposite to the direction indicated by the arrow C. The ducts 131 and 141 are thus placed in open communication with the duct 146 by way of the interior of the valve housing 143 so that the pressure in these ducts and also the pressure within the cylinder 154 is dependent upon the pressure exerted by the biasing means of the one-way valve 147. Upon the pressure in the duct 132 rising to too high a value, the plungers 152 and 153 which are subjected to this pressure by way of the duct 149 are moved in the direction D against the pressure exerted upon the piston 155 so that the ducts 149 and 157 come into open communication by way of an approximately central region of the cylindrical bore of the valve housing 150. The ducts 131 and 132 are thus brought into open communication so that the motor 118 is no longer driven by the pump 117.

The relatively high and low pressure ducts 131 and 132 can be brought into open communication in the same manner as described above, the pressure in cylinder 154 being relieved, to prevent the motor 118 being driven by displacing the valve member provided in the valve housing 63 in the direction indicated by the arrow E in FIGURE 9. Such displacement causes the head 81 of the valve member to break the communication between the ducts 158 and 159 and, instead, to establish a communication between the ducts 158 and the duct 160 which leads directly to the reservoir 140. As soon as the cylinder 154 communicates directly with the reservoir 140, the pressure acting upon the piston 155 is neutralised and either all the plungers 151 to 153 or two of the plungers 152 and 153 are moved in the direction indicated by the arrow D under the action of the relatively high pressure existing in either the duct 148 or the duct 149. Open communication is immediately established between the ducts 131 and 132 in one or other of the two ways which have previously been described.

The valve member in the valve housing 63 is arranged to be displaced by the control lever 11. When the said lever occupies a central position in which the swash plate 123 of the pump 117 is disposed perpendicular to the longitudinal axis of the shaft 120, so that the pump 117 does not supply hydraulic pressure medium to the motor 118, the plate 62 is located in register with the slots 100 and 101. The compression spring 61 bears against the plate 60 and turns the control lever 11, to which the plate 60 is connected, about the pin 27 in the direction indicated by the arrow F in FIGURES 3 and 7. The tip 78 of the pin 79 bears against the head 80 of the valve member and, upon the plate 60 pushing the bolt 84 and rigidly connected pin 79 in the direction indicated by the arrow E in FIGURE 7, the valve member is displaced in the same direction in the block 65 of the valve housing 63 so that the duct 158 is connected with the duct 160 instead of with the duct 159. As a result, the ducts 131 and 132 are placed in open communication in the manner previously described.

When it is desired to cause the tractor to travel over the ground, the control lever 11 is turned in a direction opposite to the direction F against the action of the compression spring 61 so that the plate 62 is withdrawn from the slots 100 and 101. The head 85 of the bolt 84 is no longer blocked by the plate 60 and, accordingly, hydraulic pressure medium which is supplied by the pump 138 to the chamber 67 of the valve housing 63 by way of the ducts 137, 161, 159 and 71 and by way of the one-way valve 162, urges the valve member back in a direction opposite to the direction E so that communication is re-established between the ducts 158 and 159. As soon as the plate 62 has been withdrawn from the slots 100 and 101, the whole of the control lever 11 can be turned about the longitudinal axis of the shaft 20, such a turn causing a change in the angular setting of the swash plate 123. The control lever 11 can, initially, only be turned until the plate 62 which slides along either the portion 102 or the portion 103 of the abutting edge of the plate 99 meets either the step 104 or the step 105. The arrangement is preferably such that, when the plate meets one of these two steps, the tractor can travel either forwardly or rearwardly at a speed of about six or seven miles per hour. When it is desired to obtain a higher speed, the control lever 11 must be turned further about the pin 127 in a direction opposite to the direction F so that the plate 62 can be slid further along either the portion 106 or the portion 107 of the said edge of the plate 99. The steps 108 and 109 afford stops defining the maximum angular displacement of the control lever 11, and consequently of the swash plate 123, which can be effected and it will be understood that, when the plate 62 is in engagement with either of these steps, the tractor will be travelling either forwardly or rearwardly at its maximum velocity. The purpose of the intermediate steps 104 and 105 is to ensure that a specific operation must be performed before any considerable speed is attained so that any likelihood of this happening inadvertently is very greatly reduced.

In an emergency or for some other reason, it may happen that it is desired to obtain an immediate stoppage of the drive to the ground wheels 2. This can be effected in any position of the control lever 11 about the longitudinal axis of the shaft 20 merely by displacing the said lever in the direction F about the pin 27. Whatever the position of the plate 62 relative to the plate 99, the plate 62 is moved to the right in FIGURE 7 and causes the interconnected plates 99, 97, 88 and 93 to turn about the shaft 91 in the direction indicated by the arrow G in FIGURE 7, this turning movement being opposed by the compression spring 110. The plate 60, which is connected to the control lever 11, bears against the head 85 of the bolt 84 and moves the said bolt, together with the pin 79 and the valve member in the valve housing 63, in the direction E so that, as previously described, open communication is rapidly established between the ducts 131 and 132. It should be explained that the compression spring 110 is stronger than the compression spring 61 so that the plates 99, 97, 88 and 93 can only be turned in the direction G when the force exerted by the spring 61 is augmented by the driver of the tractor urging the control lever 11 in the direction F.

Whatever the angular setting of the control lever 11 about the longitudinal axis of the shaft 20, the said lever must always be displaced in the same direction F about the pin 27 to discontinue the drive to the ground wheels 2 so that there is no likelihood of the driver of the tractor making an incorrect control movement in a sudden emergency. As previously described, the driving seat 8 of the tractor, together with control levers 9 and control pedals 10, is turnable about a substantially vertical axis and, in order that the control lever 11 shall be readily accessible from the driving seat 8 in any angular setting of the seat 8 about the said axis, the upper part of the control lever 11 can be turned relative to its lower part by withdrawing the end 50 of the locking pin 49 from the central notch 35 by moving the sleeve 57 in the direction H (FIGURE 4) and turning the tube 42 about the shaft 39 until the end 50 of the locking pin 49 enters whichever one of the notches 34 or 36 is most appropriate.

What we claim is:

1. In a hydraulic pump and motor transmission system having high and low pressure regions, the combination with said system of movable control means for varying the transmission ratio in a plurality of settings about a first axis, a valve in communication with the high and low pressure regions of the transmission system, said control means including a part that is turnable about a second axis to operate said valve in any of said transmission ratio settings, said second axis being inclined to said first axis.

2. The invention of claim 1 wherein said control means has a neutral setting about the first axis and means are provided to urge part of said control means to operate said valve whereby the high and low pressure regions are in communication.

3. The invention of claim 1 wherein the control means includes a lever portion said portion being positionable in a plurality of settings relative to a further portion of the control means.

4. The invention of claim 1 wherein a plurality of stops are provided to limit movements of the control member to vary the transmission ratio, said control member being movable in a direction to avoid the stops whereby a further range of transmission-varying movements are possible.

5. The invention of claim 4 wherein the stops are formed on a single element.

6. The invention of claim 1 wherein the control means includes a spring member and stop means, said spring member and said stop means being opposed to each other in a plurality of settings of said control means other than in a neutral setting about said first axis.

7. The invention of claim 6 wherein the stop means is turnable about a third axis, said third axis being inclined to said first axis.

8. The invention of claim 6 wherein the stop means is movable whereby the valve can be operated when the control means is positioned in any setting.

9. The invention of claim 8 wherein spring means resists displacement of the stop means by said control means.

10. The invention of claim 9 wherein the resistance of the spring means can be adjusted.

11. In a hydraulic pump and motor transmission system having high and low regions, the combination with said system of movable control means for varying the transmission ratio in a plurality of settings about a first axis, said control means including a stop plate and a stop member, said plate being adapted to move along said member during movement of the control means to vary the transmission ratio, said member having a recess to receive said plate in a neutral setting of said control means, a valve in communication with the high and low pressure regions of the transmission system, said control means including a part that is turnable about a second axis to operate said valve in said neutral setting, said first axis being inclined to said second axis.

12. In a hydraulic pump and motor transmission system having high and low pressure regions, the combination with said system of movable control means for varying the transmission ratio in a plurality of settings in a first direction, a valve in communication with the high and low pressure regions of the transmission system, said control means including a part that is movable in a second direction inclined to said first direction to operate said valve in any of said transmission ratio settings.

References Cited by the Examiner

UNITED STATES PATENTS

| | | | |
|---|---|---|---|
| 1,407,047 | 2/22 | Trowbridge | 60—53 |
| 2,008,687 | 7/35 | Dean. | |
| 2,669,185 | 2/54 | Tallis | 103—38 |
| 2,747,509 | 5/56 | Pool | 103—38 |
| 2,769,398 | 11/56 | Buckley | 103—160 |

JULIUS E. WEST, *Primary Examiner.*

EDGAR W. GEOGHEGAN, *Examiner.*